United States Patent
Day (10) Patent No.: US 7,219,153 B1
(45) Date of Patent: May 15, 2007

(54) METHODS AND APPARATUS FOR DISTRIBUTING CONTENT

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 835 days.

(21) Appl. No.: 10/307,705

(22) Filed: Dec. 2, 2002

(51) Int. Cl.
G06F 15/16 (2006.01)

(52) U.S. Cl. ............... 709/229; 709/223; 709/224; 709/225; 709/217; 707/10

(58) Field of Classification Search ........ 709/217, 709/226, 219, 201, 203, 223, 224, 225, 227, 709/229; 707/10
See application file for complete search history.

(56) References Cited

U.S. PATENT DOCUMENTS

| | | | |
|---|---|---|---|
| 5,956,716 A * | 9/1999 | Kenner et al. ............. 709/217 |
| 6,212,548 B1 | 4/2001 | DeSimone et al. ......... 709/204 |
| 6,268,856 B1 * | 7/2001 | Bruck et al. ................ 709/217 |
| 6,301,609 B1 | 10/2001 | Aravamudan et al. ..... 709/207 |
| 6,308,238 B1 | 10/2001 | Smith et al. ................ 710/129 |
| 6,336,133 B1 | 1/2002 | Morris et al. ............... 709/204 |
| 6,339,784 B1 | 1/2002 | Morris et al. ............... 709/204 |
| 6,366,907 B1 | 4/2002 | Fanning et al. ................ 707/3 |
| 6,366,962 B1 | 4/2002 | Teibel ....................... 709/245 |
| 6,434,536 B1 | 8/2002 | Geiger ......................... 705/37 |
| 6,449,344 B1 | 9/2002 | Goldfinger ............... 179/88.17 |
| 6,496,851 B1 | 12/2002 | Morris et al. ............... 709/204 |
| 6,798,358 B2 * | 9/2004 | Joyce et al. ............. 455/414.2 |
| 6,907,225 B1 * | 6/2005 | Wilkinson ................ 455/41.2 |
| 6,928,463 B1 * | 8/2005 | Tene et al. .................. 709/203 |
| 7,024,205 B1 * | 4/2006 | Hose ......................... 455/517 |
| 2002/0147929 A1 * | 10/2002 | Rose ......................... 713/201 |
| 2003/0125062 A1 * | 7/2003 | Bethards et al. ............ 455/517 |
| 2004/0003046 A1 * | 1/2004 | Grabelsky et al. .......... 709/206 |
| 2004/0038688 A1 * | 2/2004 | Zabawshyj et al. ...... 455/456.3 |
| 2004/0098491 A1 * | 5/2004 | Costa-Requena et al. ... 709/229 |
| 2005/0074101 A1 * | 4/2005 | Moore et al. .......... 379/114.01 |

\* cited by examiner

*Primary Examiner*—Philip B. Tran
(74) *Attorney, Agent, or Firm*—Bainwood Huang (57) ABSTRACT

A system incorporates notification aspects of a presence system with content distribution capabilities of a content delivery network to both notify subscribers of the presence of content from a host and provide relatively fast and efficient delivery of the content to the user. A content host provides content, such as streaming audio or video media, to a content delivery network. The content host also provides notification of the availability of the content to a central site or presence server. A subscriber to the content host receives, from the presence server, notification as to the availability of content by the content host. The subscriber also receives notification as to the location of the content in the content delivery network. Based upon the notification, the subscriber retrieves the content from the content delivery network.

16 Claims, 6 Drawing Sheets

| | 310 | 344 110-1 110-2 | 320 | 330 | 340 |
|---|---|---|---|---|---|
| | SUBSCRIBER NAME | CONTENT HOST | STATUS | SUBSCRIPTION TYPE | SUBSCRIBER GEOGRAPHIC LOCATION |
| 150-1 | SUBSCRIBER_1 | HOST_1 | ACTIVE | VIDEO MEDIA STATUS | EAST COAST |
| 150-2 | SUBSCRIBER_2 | HOST_1 | ACTIVE | PROVIDER STATUS | WEST COAST |
| 150-3 | SUBSCRIBER_3 | HOST_2 | INACTIVE | PROVIDER STATUS | EAST COAST |
| | . . . | . . . | 110-3 . . . 376 | . . . | . . . |
| 150-N | SUBSCRIBER_K | HOST_1 | ACTIVE | PROVIDER STATUS | EAST COAST |

167 →
- PROVIDER STATUS — 410
- AUDIO MEDIA STATUS — 420
- AUDIO MEDIA URL — 430
- VIDEO MEDIA STATUS — 440
- VIDEO MEDIA URL — 450

METHODS AND APPARATUS FOR DISTRIBUTING CONTENT

BACKGROUND OF THE INVENTION

Computer networks, such as the Internet, allow users to access information stored within, or associated with, the network. For example, a user can access information as content in the form of a file (e.g., text, audio, or video) or as a stream (e.g., a stored stream or a live stream) involving one-way delivery of a relatively large number of bits to a destination with a relatively small number of bits returning to the source as a control mechanism.

Certain networks, such as content delivery networks (CDN) allow for distribution of content to requesting users. A conventional CDN utilizes a group of servers for delivery of content to a requesting user based on the distances among the requesting user, an originating content server (content origin), and content delivery servers. The distances can be based upon geography, network topology, network performance, or other metrics. A content delivery manager (CDM) associated with the CDN copies, or coordinates the copying of, the content from the originating content server to the content delivery servers within the CDN. Such servers are usually located at geographically distinct locations, although some locations can have multiple servers. When a user requests content (e.g., a Web page) from a content origin, CDN mechanisms redirect the request in accord with CDM-determined policy so that the request is sent to a suitable content delivery server within the CDN. A suitable server is a server that is "close" to the requester in terms of the distances considered by the CDN. The CDN mechanisms for redirection can include modifying the DNS mapping so that the server appears to be the origin server, explicit redirection of a request to a different server, the interception of candidate requests at the routers near each server, or any of a number of other mechanisms of redirecting requests. By redirecting the request to a server closer to the user, the CDN provides relatively fast delivery of the content to the user. The CDN also acts to load balance multiple requests for content among the content delivery servers associated with the CDN to provide protection from large surges in traffic and overloading of a single content delivery server.

Other types of networks or systems provide a user with information (e.g., presence information) relating to the availability (e.g., whether "online" or "offline") of other users on the network. A conventional presence system, for example, allows users to subscribe to each other (e.g. place each other on a contact list or a buddy list) and receive notification or presence information relating to the availability (e.g., "online" or "offline" status) of the subscribed users within the presence system. Based on receiving notification of a first user's online status, a second user can then decide whether or how (e.g., using instant messaging) to make contact with the first user.

A conventional presence system includes a number of users in communication with a central site or presence server. When a first user wants to receive the presence information associated with a second user, the first user transmits to the presence server a request (e.g., subscription request) for presence information related to the second user. In response, the presence server transmits presence information relating to the presence of the second user on the presence system. Each time that the presence information of the second user changes (e.g., the status of the second user changes from "online" to "offline") the presence system delivers the changed presence information to the first user to indicate the change in availability or status of the second user.

Conventional presence-related systems, such as peer-to-peer file-sharing systems, utilize presence system notification relating both the presence of a user on the presence system and to the availability of files from the user. For example, assume a first user notifies a presence server of his availability within the presence system and provides a catalog or list of audio files that the first user has available for transfer or download to other interested users within the system (e.g., provides presence information to the presence server). The presence server notifies a second, subscribing user of the availability or presence of the first user and the audio files available from the first user. The second user can then retrieve any of the available audio files directly from the first user.

SUMMARY

Conventional techniques for providing content to a user suffer from a variety of deficiencies. In particular, conventional systems (e.g. content delivery networks) lack sufficient methods for using presence information to control the distribution of content within a network.

As described above, a conventional content delivery network utilizes a group of servers for delivery of content to a requesting user based on the distances among the requesting user, an originating content server (content origin), and content delivery servers. The distances can be based upon geography, network topology, network performance, or other metrics. A content delivery manager (CDM) associated with the CDN copies, or coordinates the copying of, the content from the originating content server to the content delivery servers within the CDN. Such servers are usually located at geographically distinct locations, although some locations can have multiple servers. When a user requests content from a content origin, CDN mechanisms redirect the request in accord with CDM-determined policy so that the request is sent to a suitable content delivery server within the CDN. A suitable server is a server that is "close" to the requester in terms of the distances considered by the CDN. By redirecting the request to a server closer to the user, the CDN provides relatively fast delivery of the content to the user. The CDN also acts to load balance multiple requests for content among the content delivery servers associated with the CDN to provide protection from large surges in traffic and overloading of a single content delivery server.

Conventional content delivery networks, however, do not maintain subscriber information regarding users of the network. When a conventional content delivery network receives updated content (e.g., a new Web page) from an originating content server, therefore, the content delivery network does not notify users of the network of the updated content. Users of the content delivery network must monitor the content delivery network for updates to particular types of content. Such monitoring can be time consuming for the user.

Also as described above, conventional presence systems allow users to subscribe to each other and receive notification (e.g., presence information) relating to the availability of the subscribed users within the presence system. Conventional presence systems, however, have a limited transmission capacity and typically are not configured to deliver content having a relatively large size (e.g., audio files, video files, or streaming media) among subscribers. In the case where presence-type systems, such as peer-to-peer file-sharing systems, allow presence and content notification for a user (e.g., host) in the distribution system, subscribers retrieve the available files directly from the host. The host plays a role comparable to the origin server in a CDN system, but there are no other servers to aid in the distribution of content. When many subscribers retrieve content from the same host at the same time, however, the host can decrease the data transfer rate of the files to the subscribers, thereby increasing the amount of time required by the subscriber to receive the files. While multiple servers can be available with copies of any given file, there exists little coordination among the hosts holding these multiple copies, thereby limiting establishment of a consistent policy regarding the number of copies of the file or placement of the file in the network.

By contrast, embodiments of the present invention incorporate notification aspects of a presence system with content distribution capabilities of a content delivery network to both notify subscribers of the presence of content from a host and provide relatively fast delivery of the content to the user. A content host provides content, such as streaming audio or video media, to a content delivery network. The content host also provides notification of the availability of the content to a central site or presence server. A subscriber to the content host receives, from the presence server, notification as to the availability of content associated with the content host. The subscriber also receives notification as to the location of the content in the content delivery network. For example, the subscriber receives a uniform resource locator (URL) associated with a content server or content delivery manager of the content delivery network. Based upon the notification, the subscriber retrieves the content from the content delivery network.

In one embodiment, the invention relates to a method for providing content from a content host using a content delivery network having content servers and having a content delivery manager that directs placement of the content among the content servers. In the method, a computerized device receives presence information from the content host where the presence information indicates the availability of content associated with the content host and the content host different from any of the content servers and different from the content delivery manager of the content delivery network. The computerized device receives a subscription request from a content subscriber and transmits a notification message to the content subscriber. The computerized device also transmits a notification message to each content subscriber for every subsequent change in the availability, or other aspects, of the content. The notification message has the presence information from the content host, indicating availability of content associated with the content host, and has network information indicating the content delivery network having the content received from the content host. The notification message enables the content subscriber to acquire the content from the content delivery network, as opposed to receiving the content only from the content host. The method allows a content subscriber to receive notifications as to the availability of content from a content host and to retrieve the content from the content delivery network, thereby providing relatively efficient use of network resources.

In another embodiment, when receiving a subscription request, the computerized device receives content subscriber identifier information from the content subscriber. In response to receiving the content subscriber identifier information, the computerized device transmits the content subscriber identifier information to the content delivery manager to allow the content delivery manager to identify at least one content server for providing the content to the content subscriber. By transmitting the content subscriber identifier information to the content delivery manager, the computerized device allows the content delivery manager to select a content server for relatively fast or efficient distribution of the content to the content subscriber.

In another embodiment, the computerized device receives network information from the content delivery network or the content delivery manager of the content delivery network. The network information indicates the content server for providing content to the subscriber, based upon the content subscriber identifier information. By receiving network information from the content delivery manager, in the case where the content delivery manager moves the content among the content servers, the computerized device stores the most recent or updated information regarding the content location and can provide the updated information to the content subscribers.

In another embodiment, when receiving a subscription request, the computerized device receives content subscriber identifier information from the content subscriber and, in response to receiving content subscriber identification information, the computerized device receives an access restriction from the content host where the access restriction indicating a limitation on content access for a content subscriber. The computerized device also detects content subscriber access to the presence information based upon a comparison between the content subscriber identifier information and the access restriction. By detecting content subscriber access to the presence information, the computerized device prevents unauthorized subscribers from accessing restricted content on the content delivery network.

In another embodiment, when receiving an access restriction, the computerized device receives a hierarchical arrangement of presence information from the content host, the hierarchical arrangement indicating a subscription constraint for the presence information. By utilizing the hierarchical arrangement of presence information, the computerized device provides or restricts access for multiple content streams from the content host.

In another embodiment, the invention relates to a computerized device having at least one communications interface, a controller, and an interconnection mechanism configured to communicate with a content delivery network, the content delivery network having content servers and a content delivery manager wherein the content delivery manager directs placement of content among the content servers, the interconnection mechanism coupling the at least one communications interface and the controller. The controller of the computerized device is configured to receive, through the interface, presence information from the content host where the presence information indicates the availability of content associated with the content host and where the content host different from any of the content servers and different from the content delivery manager of the content delivery network. The controller is further configured to receive, through the interface, a subscription request from a content subscriber and transmit, through the interface, the notification message to the content subscriber and each time new or updated presence information is received, relating to the subscription. The notification message has the presence information from the content host, indicating availability of content associated with the content host, and has network information indicating the content delivery network having the content received from the content host. The notification message enables the content subscriber to acquire the content from the content delivery network.

In another embodiment, the invention relates to a method for a content delivery manager to allocate content within a content delivery network. The content delivery manager receives content from a content host where the content host different from the content delivery manager and receives content subscriber identifier information from a computerized device where the content subscriber identifier information indicates at least one subscriber for the content. The content delivery manager identifies at least one content server associated with the content delivery network for providing the content to a content subscriber, based upon the content subscriber identifier information. The content delivery manager, therefore, allocates the content within the content delivery network to provide relatively efficient delivery of content to the content subscribers based upon a characteristic (e.g., content subscriber identifier information) of the content subscribers.

In another embodiment, the invention relates to a method for providing content from a content delivery network. The content delivery manager provides content, received from a content host, to a content subscriber where the content host different from the content delivery manager. The content delivery manager receives updated content from the content host, the updated content having linking information. The content delivery manager provides the updated content, having the linking information, to the content subscriber. The linking information allowing the content subscriber to retrieve secondary content associated with the content host. By transmitting the embedded linking information within the content stream, the content delivery manager allows the content host to provide updated presence information to a content subscriber without using a presence system.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the device encodes the memory system with a subscriber manager application that, when performed on the controller, produces a subscriber manager process that causes the computer system to perform any and/or all of the method embodiments, steps and operations explained herein as embodiments of the invention. Also, a switch, router or other device programmed or otherwise configured to operate as explained herein is an embodiment of the invention.

Other arrangements of embodiments of the invention disclosed herein include software programs to perform the method embodiment steps and operations as summarized above and disclosed in detail below. As an example, a subscriber manager software control application, such as a data communications device operating system configured to operate as explained herein is an embodiment of the invention. More particularly, a computer program product is disclosed which has a computer-readable medium including computer program logic encoded thereon that, when executed on at least one processor or controller, causes the processor or controller to perform the operations (e.g., the methods) indicated herein as embodiments of the invention.

Such arrangements of the invention are typically embodied as software, logic instructions, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). These software or firmware or other such configurations include those installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for distributing content in a networked computer environment, such that the computer program logic, when executed on at least one processing unit with the presence server, causes the at least one processing unit to perform any or all of the aforementioned methods.

In one example embodiment, computer software and/or hardware mechanisms implement the methods embodiments of the invention within a data communications device apparatus. It is to be understood that the system of the invention include those embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention incorporate notification aspects of a presence system with content distribution capabilities of a content delivery network to both notify subscribers of the presence of content from a host and provide relatively fast and efficient delivery of the content to the user. A content host provides content, such as streaming audio or video media, to a content delivery network. The content host also provides notification of the availability of the content to a central site or presence server. A subscriber to the content host receives, from the presence server, notification as to the availability of content associated with the content host. The subscriber also receives notification as to the location of the content in the content delivery network. For example, the subscriber receives a uniform resource locator (URL) associated with a content server or content delivery manager of the content delivery network. Based upon the notification, the subscriber retrieves the content from the content delivery network.

Figure 1:
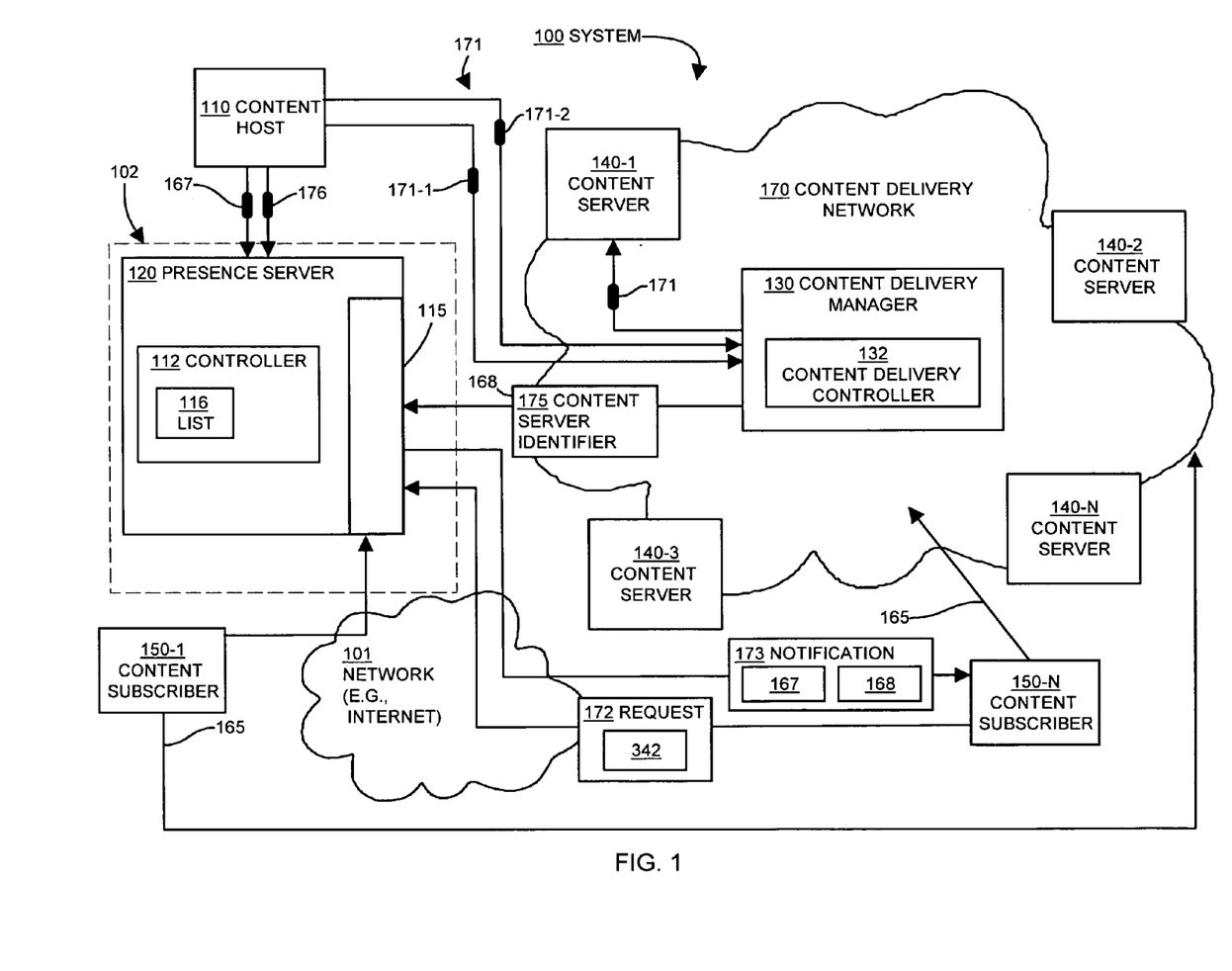
FIG. 1 shows a system for distributing content, according to one embodiment of the invention.

FIG. 1 shows a system 100 for distributing content, according to one embodiment of the invention. The system 100 includes a presence system 102, a content delivery network 170 and content subscribers 150-1 and 150-N. The system 100 combines subscription and notification aspects of the presence system 102 with content delivery aspects of the content delivery network 170 to notify users or content subscribers 150 as to the availability and location of content within the system 100.

The presence system 102, in one embodiment, includes a presence server 120 and a content host 110. The presence server 120 is a computerized device having a controller 112, such as a memory and a processor, and a communications interface 115. A network 101 connects the content subscribers 150 with the presence server 120 and allows for distribution of presence information 173 from the presence server 120. In one embodiment, the network 101 is the Internet or a local area network (LAN).

The content host 110 is a computerized device (e.g., a computer, such as a personal computer) configured to transmit the content 171 to the content delivery network 170 for further distribution to the content subscribers 150. The content host 110 is also configured to transmit notification or presence information 167 to the presence server 120 regarding the availability of content 171 associated with the content host 110, such as content 171 originating from the content host 110.

The content delivery network 170, in one embodiment, includes a content delivery manager 130, such as a computer having a content delivery controller 132 (e/g. memory and processor), and content servers 140-1, 140-2, 140-3, and 140-N. The content delivery network 170 connects the content subscribers, 150-1, 150-N with the content delivery manager 130 and content servers 140-1, 140-2, 140-3, and 140-N associated with the content delivery network 170 and allows for distribution of content 171 to the content subscribers 150-1, 150-N. In one embodiment, the content delivery network 170 is the Internet or is a local area network (LAN).

In one embodiment of the system 100, for example, the content host 110 provides content 171, such as unique audio or video streams, to the content delivery network 170. For example, a content host operator can provide real time video or audio streams 171 to the content delivery network 170 either as he creates the streams 171 or as he receives the streams from secondary sources (e.g., audio playing on the operator's compact disk player). After the content host 110 sends the content 171 (e.g., the audio or video streams) to the content delivery network 170, the content host 110 sends presence information 167, to the presence server 120, indicating the availability of the content 171 associated with the content host 110.

After the presence server 120 receives an update 167 as to the availability of content 171 associated with the content host 110, the presence server 120 distributes the notification 167 along with network information 168 indicating the location of the content 171, relative to the content delivery network 170, to the content subscribers 150 (e.g., computerized devices such as personal computers). Such distribution allows the content subscribers 150 to access the content 171, associated with the content host 110, from the content delivery network 170.

Figure 2:
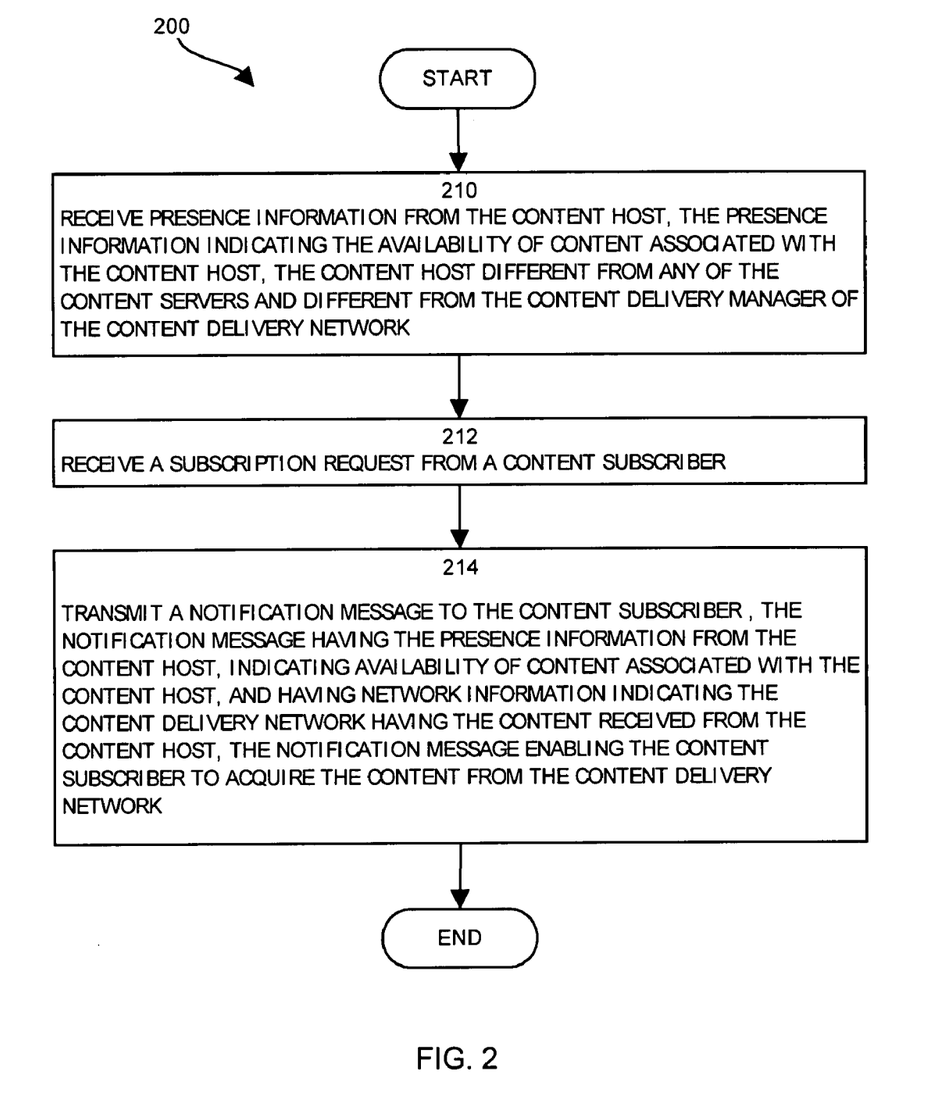
FIG. 2 illustrates a flow chart of a procedure performed by the system of FIG. 1, according to one embodiment of the invention.

FIG. 2 illustrates a flow chart 200 of a procedure performed by the presence server 120 of the system 100 of FIG. 1, according to one embodiment of the invention.

In step 210, the presence server 120 receives presence information 167 from the content host 110 where the presence information 167 indicates the availability of content 171 associated with the content host 110. The content host 110 is different from any of the content servers 140-N and is different from the content delivery manager 130 of the content delivery network 170.

In one embodiment, the presence information 167 indicates the availability of content 171 associated with the content host 110. In another embodiment, the presence information 167 indicates changes to the content 171 available from the content host 110. For example, assume a content host 110 provides a first media stream 171-1 (e.g., audio stream) to the content delivery network 170 and presence information 167 to the presence server 120 indicating the availability of the first media stream 171-1. Also assume that at a later time, the content host 10 provides a second media stream 171-2 (e.g., video stream) to the content delivery network 170. At the later time, the content host 110 provides updated presence information 167 to the presence server 120 indicating the availability of the second media stream (e.g., a change in the content 171 associated with the content host 110).

In step 212, the presence server 120 receives a subscription request 172 from a content subscriber 150-N. In one embodiment, the subscription request 172 relates to a request for information relating to a particular content host 110. When the content subscriber 150-N wants to receive notification 167 as to the availability of the particular content 171 associated with the content host 110, the content subscriber 150-N sends a subscription request 172 to the presence server 120. In one embodiment, the presence server 120 maintains information related to the subscription request 172 within a content subscriber list 116 to track additions or deletions of content subscribers 150 for a particular content host or hosts 110. Such an aspect of the presence server 120 will be described in further detail with respect to FIG. 3.

Regarding FIG. 2, the subscription request 172 relates to a request for the status of content 171 associated with a content host 110. In one embodiment, the subscription request 172 includes a request for the current (e.g., most recent) value or version of the presence information 167 for a particular content host 110. In another embodiment, the subscription request 172 includes a request for notification for a change in presence information 167 (e.g., addition of a content stream) for a particular content host 110. In yet another arrangement, the subscription request 172 includes a request for both the current value of the presence information 167 for information relating to a change in presence information 167 of a particular content host 110.

In step 214, the presence server 120 transmits a notification or advertisement message 173 to the content subscriber 150-N. The notification message 173 has the presence information 167 from the content host 110, indicating availability of content 171 associated with the content host 110, and has network information 168 indicating the content delivery network 170 having the content 171, received from the content host 110. The notification message 173 enables the content subscriber 150-N to acquire the content 171 from the content delivery network 170.

In one arrangement, the presence server 120 transmits the notification message 173 to the content subscriber 150-N in response to receiving a subscription request 172 from the content subscriber 150-N. Alternately, the presence server 120 transmits the notification message 173 to the content subscriber 150-N in an asynchronous manner (e.g., not in response to a subscriber request 150). For example, the presence server 120 transmits the notification message 173 to the content subscriber 150-N in response to receiving an update from the content host 110 regarding a change in the content 171 or the availability of the content associated with the content host 110.

The presence information 167 indicates to the content subscriber 150-N the availability of content 171 associated with the content host 110. For example, the presence information 167 indicates the availability of a real time audio or video stream originating from the content host 110. The presence information 167 can also indicate a change in the availability of the content 171 from the content host 110 (e.g., addition or deletion of content streams).

In addition, the presence information 167 indicates the availability of multiple content streams 171 from a single content host 110. For example, when the subscriber 150 transmits the subscription request 172 to the presence server, the subscription request 172 can include a request for notification relating to the availability of all content 171 associated with a content host 110 (e.g., multiple content streams) or relating to the availability of a portion of the content 171 associated with a content host 110 (e.g., a single content stream). When a subscriber 150 requests notification for multiple content streams 171, the presence server 120 transmits presence information 167 to the content subscriber 150 indicating the availability of such content streams 171 associated with (e.g., originating from) the content host 110.

The network information 168, as described above, indicates, to the content subscriber 150, information regarding the content delivery network 170 having or storing the content 171 as received from the content host 110. For example, the network information 168 can be a URL address or Internet Protocol (IP) address of the content delivery manager 130 or a content server 140 associated with the content delivery network 170. The content subscriber 150 uses the network information 168 to establish communications 165 with an element of the network 170 in order to receive the content 171 as provided by the content host 110.

Prior to providing the network information 168 to the content subscriber 150 as part of the notification message 173, the presence server 120 first receives notification regarding the location of the content 171, associated with the content host 110, relative to, or within, the content delivery network 170. In one embodiment, the presence server 120 receives network information 168 from the content delivery network 170.

For example, the presence server 120 receives network information 168 from the content delivery manager 130 as a content server identifier 175, as shown in FIG. 1. In one embodiment, the content server identifier 175 is an IP address of a content server 140 of the content delivery network 170 that stores or provides the content 171 received from the content host 110. The presence server 120 transmits the content server identifier 175 to the content subscriber 150 that the content subscriber 150 uses to access the content 171 from the content server 140. In another embodiment, the content server identifier 175 is the IP address of content delivery manager 130. When the content subscriber 150 uses the IP address to access particular content 171 from the content delivery manager 130, the content delivery manager 130, for example, either provides the content 171 directly to the content subscriber 150, redirects the content subscriber 150 to a content server 140 that stores the content 171, or provides, to the content subscriber 150, the IP address of the content server 140 that stores the content 171 such that the content subscriber 150 can establish communications with the content server 140.

Also as shown in FIG. 1, in another embodiment, the subscription request 172 includes content subscriber identifier information 342. The content subscriber identifier information 342, informs the presence server 120 regarding the status or identity of the content subscriber 150. For example, the content subscriber identifier information 342 includes the name of the content subscriber 150, the source address (e.g., IP address) of the content subscriber 150, or the geographic location of the content subscriber 150.

In one embodiment, the presence server 120 maintains the content subscriber identifier information 342 for a content subscriber 150, along with the relationship (e.g., subscription relationship, such as based upon a subscription request 172) between the content subscriber 150 and content host 110, within a table or list 116.

Figure 3:
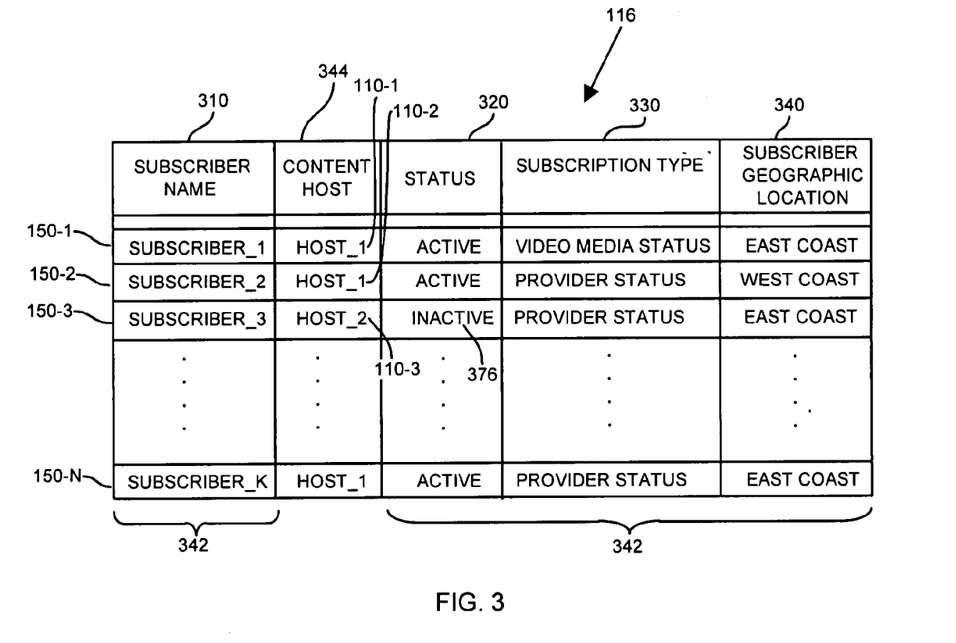
FIG. 3 illustrates a list of subscribers, according to one embodiment of the invention.

FIG. 3 illustrates an arrangement of the list 116 maintained by the presence server 120. When the presence server 120 receives multiple subscription requests 172 from multiple subscribers 150, for example, each subscriber 150-1, 150-2, 150-3, 150-N receives a separate entry in the table 116. The list 116 also identifies content host information 344 that indicates the subscription relationship between a particular content subscriber 150 and a particular content host 110.

The list 116 contains, for each content subscriber 150, subscriber identification information 342, such as subscriber name information 310, status information 320 relating to the subscriber, subscription type 330, and subscriber geographic location information 340. The subscriber information 310 relates to the name or identification of a subscriber 150 that requests presence information 167 from a content host 110. The status information 320 indicates the subscription status of the subscriber 150, whether active 372 or inactive 376. For example, when providing notification or presence information 167 relating to the availability of content 171 associated with the content host 110, the presence server 120 utilizes the status information 320 in order to prevent, or limit notifying, inactive subscribers 150 as to the availability of content 170, thereby limiting a burden on network resources while supporting the accumulation of network or geographic information about a subscriber 150. Entries about subscribers 150 that have been inactive for a relatively long time, or are otherwise considered low-value, can be deleted. The subscription type 330 indicates the type of content 171 for which the subscriber 150 subscribes and for which the presence server 120 notifies the subscribers 150. For example, as shown, the second subscriber (e.g., subscriber_2) 150-2 subscribes to status notifications (e.g., provider status) for all content 171 available for the provider or content host 110-2 and receives notification 167 for all available content from the content host 110-2. Also as shown, the first subscriber (e.g., subscriber_1) 150-1 subscribes to status notifications (e.g., video media status) for video content available from the content host 110-1 and receives notification relating to the availability of only video content from the content host 110.

In one embodiment, the presence system 120 uses the content subscriber identifier information 342 to provide or restrict a content subscriber 150 access to notification or presence information 167 relating to content 171 associated with a content host 110. As shown in FIG. 1, the presence server 120 receives an access restriction 176 from the content host 110. The access restriction 176 relates to a limitation on a content subscriber's 150-N access to content 171. The presence server 120 detects content subscriber 150 access to the presence information 167 by comparing the content subscriber identifier information 342 and the access restriction 176. Accordingly, the presence server 120 is configured to provide or restrict transmission, to the content subscriber 140, of presence information 167 based on the results of the comparison.

With respect to a presence system 102, a content host 110 can engage a "polite blocking" function to filter the presence information 167 delivered to a content subscriber 150, based upon the identity of the content subscriber 150. For example, assume the content host 110 identifies a subset of content subscribers 150 that do not have access to particular content 171 (e.g., audio content) associated with the content host 110. The content host 110, in that case, provides an access restriction 176 (e.g., notification relating to the subscriber information 310) to the presence server 120 regarding content subscribers 150 that are unauthorized for access to such content 171. The presence server 120 then compares the access restriction 176 with the subscriber identification information 342 within the list 116. Assume the presence server 120 detects a correspondence between the access restriction 176 and the subscriber identification information 342 for particular content subscribers 150. The presence server 120, in turn, restricts sending presence information 167 (e.g., notification messages 173) to the particular content subscribers 150 relating to the availability of the content 171 associated with the content host 110. The presence server 120, therefore, is configured to control subscriber 150 access to the content delivery network 170 based on the access information 176 provided by the content host 110.

Figure 4:
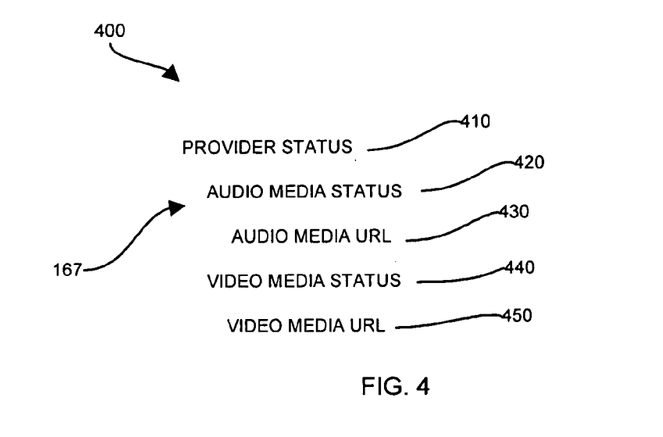
FIG. 4 depicts a hierarchical relationship among content elements from a content source, according to one embodiment of the invention.

In one arrangement, the access restriction 176 includes a hierarchical arrangement 400 of presence information 167 from the content host 110 where the hierarchical arrangement 400 indicates subscription constraints for the presence information 167. For example, the hierarchical arrangement 400 allows the presence server 120 to selectively transmit, to a subscriber 150, presence information 167 relating to a content host 110 based upon the subscriber's 150 level of subscription with respect to the presence information 167. The hierarchical arrangement 400 allows the presence server 120 to provide presence information 167 to respective content subscribers 150 for multiple streams of content 171 from a content host 110, based upon the content subscribers 150 subscription status.

FIG. 4 illustrates the hierarchical arrangement 400 of presence information elements, according to one embodiment of the invention. The hierarchical arrangement 400 implies relationships among the presence information elements within the hierarchy. As shown, arrangement of the presence information 167 includes provider status 410, audio media status 420, and video media status 440.

Provider status 410 represents the root or top level in the hierarchy 400. When a subscriber 150 subscribes to a provider status 410 level, the subscriber 150 receives notifications 167 regarding all content 171 available from a content host 110 (e.g., all presence information elements).

For example, assume a content subscriber 150 transmits a subscription request 172 to the presence system 120 requesting presence information (e.g., notification) 167 as to the provider status 410 of the content host 110. In such a case, the presence server 120 provides presence information 167 to the subscriber 150 regarding the availability (e.g., status) or a change in the availability of all content 171 (e.g., all hierarchical levels) associated with the content host 110.

The root hierarchical element 410, in one embodiment, includes one or more hierarchically arranged sublevels that relate to distinct subscription constraints for particular content subscribers 150. For example, a first sublevel 420 beneath the provider status level 410 includes the audio media status level and a second sublevel 440 beneath the provider status level 410 includes a video media status level.

Assume a content subscriber 150 transmits a subscription request 172 to the presence server 120 requesting presence information 167 relating to the video media status 450 of the content host 110. The presence server 120 retains the request 172 as content subscriber identifier information 342 (e.g., subscription type information 330), such as stored in the list 116. The presence server 120 also receives an access restriction 176 from the content host 110 in the form of the hierarchically arranged presence information 167. The presence system 120 then compares the subscription type information 330 with the hierarchically arranged 400 presence information 167 to determine access, for the content subscriber 150, to presence information elements within the hierarchical arrangements 400. Because of the hierarchical arrangement 400 of the presence information 167, the presence server 120 provides notification to the subscriber 150 regarding the availability (e.g., status) or a change in the availability of a particular type of content 171, in this case video content, to the subscriber 150.

In another configuration, each sublevel 420, 440 includes URL information 430, 450, respectively. When the presence server 120 transmits content status information 420, 440 to a subscriber 150, the presence server 120 also transmits, to the subscriber 150, URL information 430, 450 relating to the location of the content 171 with respect to the content delivery network 170, for example. The subscriber 150 can utilize the URL information 430, 450 to either manually or automatically contact the content delivery network (e.g., content delivery manager 130 or content server 140) associated with the URL 430, 450 to retrieve the content 171 associated with the content host 110.

In another embodiment, after receiving the content subscriber identifier information 342 from a content subscriber 150, the presence system 120 transmits the content subscriber identifier information 342 to content delivery manager 130 of the content delivery network 170. The content delivery manager 130 utilizes the content subscriber identifier information 342 to identify at least one content server 140 to provide content 171 to the content subscriber 150.

As described above, the presence system 120 retains content subscriber identifier information 342 within a list 116 where the content subscriber identifier information 342 includes subscriber identification information 342, such as subscriber name information 310, status information 320 relating to the subscriber, subscription type 330, and subscriber geographic location information 340. In one arrangement, the presence server 120 transmits the table 116 to the content delivery manager 130. The content delivery manager 130, in turn, uses the geographic location information 340 in the table 116 to identify at least one (e.g., a preferred) content server 150 for storing content 171 within the content delivery network 170.

For example, as shown in FIG. 3, the list 116 indicates the subscriber geographic location information 340 for a first subscriber 150-1, a third subscriber 150-3, and a fourth subscriber 150-N as geographically located on the East Cost. The list 116 also indicates subscriber geographic location information 340 for a second subscriber 150-2 as geographically located on the West Coast. The content delivery manager 130, utilizing the subscriber geographic location information 340 within the table 116, identifies the number of content subscribers 150 located in a particular geographic location relative to the content servers 140 associated with the network 170 and relocates content 171 on the content server 140 associated with the geographic location. In this example, therefore, based on the subscriber geographic location information 340 in the list 116, the content delivery manager 130 places the content 171 from content host 110 on the content server 140 located in close geographic proximity to the East Cost because the largest number of content subscribers 150 are located on the East Coast. Such placement increases the relative delivery speed of the content 171 to a majority of the content subscribers 150 for that content 171.

After identifying or selecting a content server 140 for providing content 171 to a content subscriber 150, the content delivery manager 130 transmits network information 168 (e.g., updated network information), such as a content server identifier 175 (e.g., URL) to the presence server 120. The network information 168 indicates a particular content server or servers 140 for providing content 171 to the subscriber 150. In turn, the presence server 120 transmits the network information 168 to the content subscriber 150 as part of the notification message 173 to allow the content server 150 to retrieve the content 171, associated with the content host 110, form the specified content server 140.

As described, one of the features of the embodiments of the system 100 involves the ability of the content delivery manager 130 to control placement of content 171 among content servers 140 of the content delivery network 170. The ability to distribute content 171 among servers 140 within the content delivery network 170 allows the content delivery manager 130 to increase the relative delivery speed of content 171 to requesting content subscribers 150.

Figure 5:
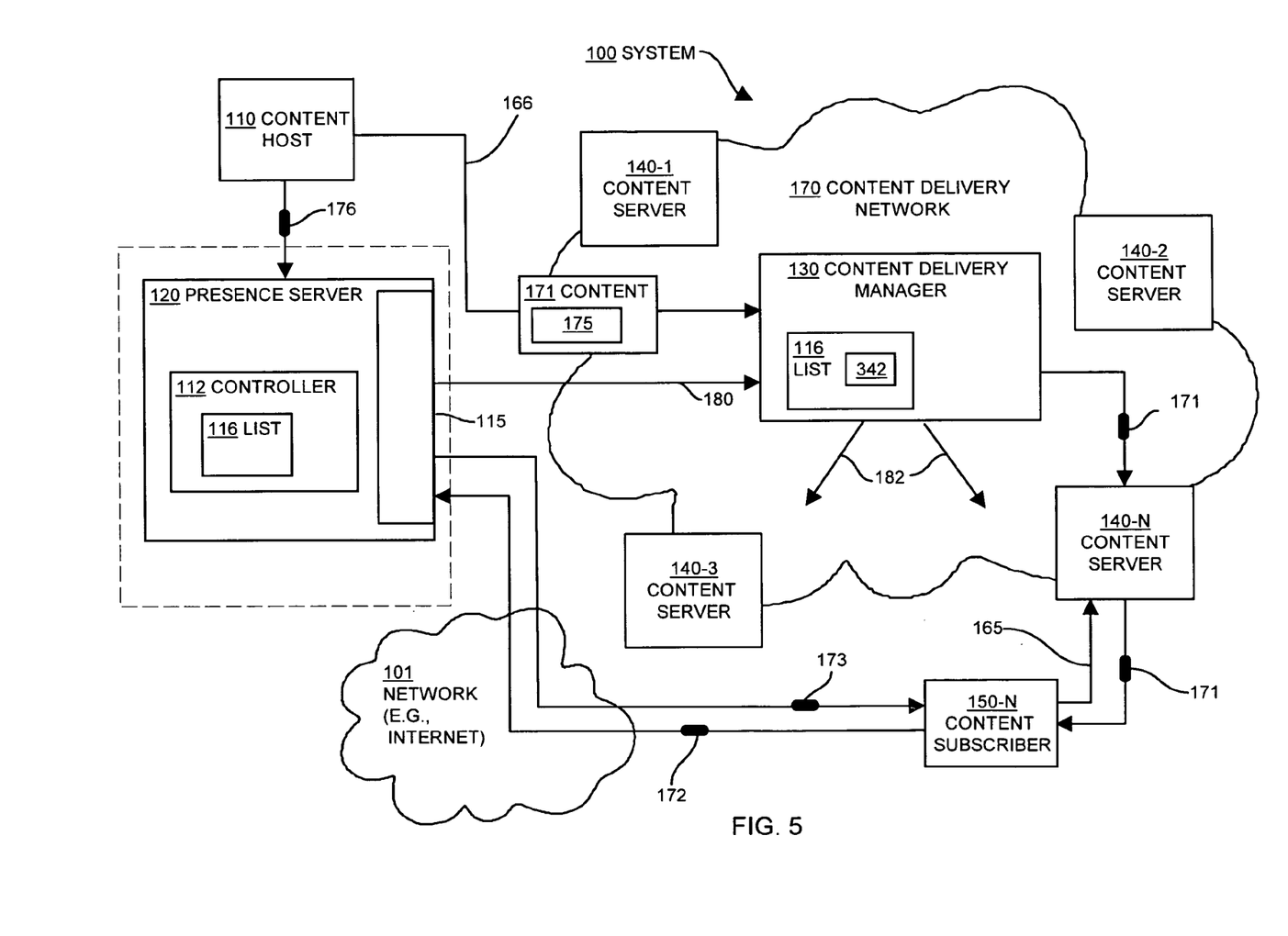
FIG. 5 shows a system for distributing content, according to another embodiment of the invention.

FIG. 5 shows an embodiment of a content delivery manager 130 identifying or selecting a content server 140 to provide content 171 to a content subscriber 150.

Initially, the content delivery manager 130 receives 166 or coordinates servers 140 to receive, through the content delivery network 170, content 171 (e.g., streaming audio or streaming video) provided by the content host 110. The content delivery manager 130, in one embodiment, places or stores the content 171 on one or more content servers 140 associated with the content distribution network 170. For example, the content delivery manager 130 arbitrarily chooses a content server 140 for distribution of the content 171.

The content delivery manager 130 then receives 180 content subscriber identifier information 342 from the presence server 120 (e.g., computerized device). The content subscriber identifier information 342, as described above, indicates at least one content subscriber 150 for the content 171. The content subscriber identifier information 342, in one embodiment, includes geographic location information relating to a content subscriber 150. In one embodiment, the content delivery manager 130 receives the content subscriber identifier information 342 from the presence server 120 as part of a list 116, as described above. For example, the presence server 120 transmits the list 116 to the content delivery manager 130 after receiving a subscription request 172 (e.g., including an unsubscribe request) from a content subscriber 150 and updating the list 116 with the content subscriber information 342.

The content manager next 130 identifies 182 a content server 140 associated with the content delivery network 170 for providing the content 171 to the content subscriber 150 based upon the content subscriber identifier information 342. A content delivery manager 130 stores content 171 on one or more content servers 140 within the content delivery network 170 to fulfill content requests, made by content subscribers 150, relatively quickly. For example, as described above, the content delivery manager 130, utilizing the content subscriber identifier information 342 (e.g., subscriber geographic location information 340) within the table or list 116, identifies the geographic location of a content subscriber 150 relative to the content servers 140 associated with the network 170. The content delivery manager 130 then can relocate content 171 to one or more content servers 140 to serve the identified population of content subscriber 150 (e.g., relocating content 171 to a Boston-based content server 140 to provide the content to a Boston-based content subscriber 150). Such relocation provides relatively efficient transfer of content 171 from the content server 140 to the content subscriber 150.

After allocating the content 171 within the content delivery network 170, the content delivery manager 130, in one embodiment, transmits updated network information 168 to the presence server 120 indicating the updated location (e.g., URL) of the allocated content 171 within the content delivery network 170. In turn the presence server 120 transmits the updated network information 168 to the content subscriber 150 to allow the content subscriber 150 to access the content 171 at the updated location (e.g., content server).

In another arrangement, the content delivery manager 130 also detects or tracks the content subscriber requests for content 171 and transmits the resulting request information to the content host 110. The content delivery manager 130 provides the request information to the content host 110 to allow the content host 110 to determine the relative usage or popularity of the content 171. Based upon an analysis of the request information, the content host 110 can limit or eliminate transmission of the content 171, such as for content 171 receiving relatively few requests (e.g., for unpopular content).

As described above, the content host 110 provides updated presence information 167 to a content subscriber 150 via the presence server 120. In another embodiment, the content host 110 provides updated presence information 167, in the form of linking information 175, to the content subscriber 150 through the content delivery network 170. For example, the content host 110 inserts the linking information 175 into the content stream 171 transmitted from the content host 110 to the content delivery manager 130.

Figure 6:
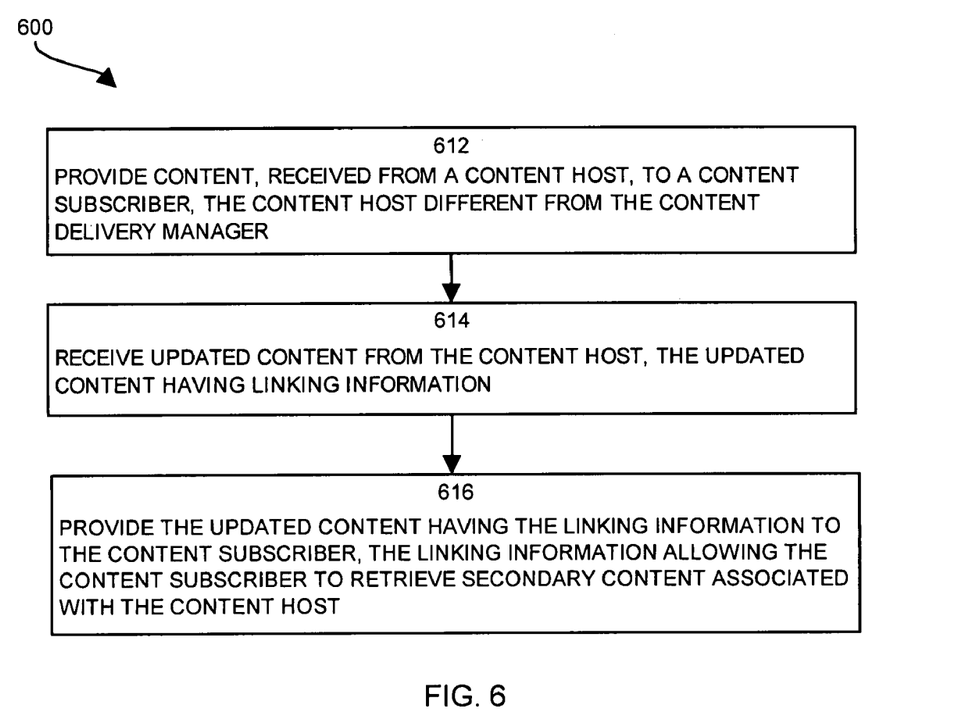
FIG. 6 illustrates a flow chart of a procedure performed by a content delivery manager, according to one embodiment of the invention.

FIG. 6 illustrates a flow chart 600 of a procedure for providing linking information to a content subscriber 150 as performed by a content delivery manager 130, according to one embodiment of the invention.

In step 612, the content delivery manager 130 provides content 171, received from a content host 110, to a content subscriber 150. As described above, the content host 110 provides content 171, such as streaming audio or video media, to the content delivery manager 130. The content host 110 also provides notification 167 (e.g., through the presence server 120), to the content subscriber 150, regarding the availability of the content 171 and the location of the content 171 within the content delivery network 170. After receiving the notification 167, the subscriber 150 establishes communication with the content delivery network 170 and retrieves the content 171 via the content delivery manager 130. In one embodiment, the content delivery manager 130 provides the content 171 directly to the content subscriber 150. In another embodiment, the content delivery manager 130 directs the content subscriber 150 to a content server 140 having the requested content 171.

In step 614, the content delivery manager 130 receives updated content 171 from the content host 110 where the updated content 171 has linking information 175. In one embodiment, the linking information 175 includes updated presence information 167 relating to the content host 110. For example, assume an operator of the content host 110 wants to provide information to a content subscriber 150 regarding his meeting schedule. The content host 110 embeds, within the content stream 171 delivered to the content delivery manager 130, linking information 175, such as a URL for a website containing the meeting schedule. By embedding the linking information 175 within the content stream 171, the content host 110 maintains the ability to provide updated presence information 167 to a content subscriber 150 without using the presence system 120.

In step 616, the content delivery manager 130 provides the updated content 171 having the linking information 175 to the content subscriber 150. The linking information 175 allows the content subscriber 150 to retrieve secondary content associated with the content host 110. In the example above, the content host 110 embeds a URL for a website containing a meeting schedule (e.g., linking information 175) within the content stream 171 delivered to the content delivery manager 130. The content delivery manager 130 transmits the URL to the content subscriber 150. In turn, the content subscriber 150 uses the URL to retrieve the meeting schedule (e.g., secondary content).

Figure 7:
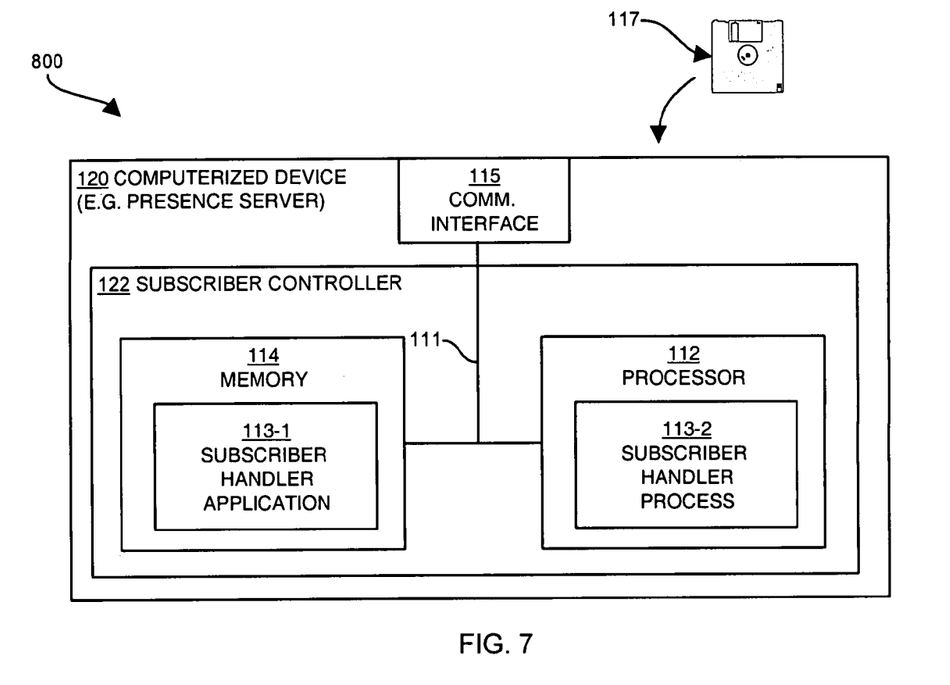
FIG. 7 depicts a computer implementation of a presence server, according to one embodiment of the invention.

FIG. 7 depicts a computer implementation 800 of the presence server 120, according to one embodiment of the invention. A computer program product 117 includes an application or logic instructions, such as subscriber handler instructions, that are loaded into the computerized device 120 to configure the computerized device 120 to maintain and establish subscription requests.

The computerized device 120 in this embodiment of the invention includes an interconnection mechanism 111 such as a data bus and/or other circuitry that interconnects a controller 122, including a memory 114 and a processor 112, and one or more communications interfaces 115.

The memory 114 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 114 is encoded with logic instructions (e.g., software code) and/or data that form a subscriber handler application 113-1 configured according to embodiments of the invention. In other words, the subscriber handler application 113-1 represents software code, instructions and/or data that represent or convey the processing logic steps and operations as explained herein and that reside within memory or storage or within any computer readable medium accessible to the computerized device 120.

The processor 112 represents any type of circuitry or processing device such as a central processing unit, microprocessor or application-specific integrated circuit that can access the subscriber handler application 113-1 encoded within the memory 114 over the interconnection mechanism 111 in order to execute, run, interpret, operate or otherwise perform the subscriber handler application 113-1 logic instructions. Such performance of the subscriber handler application 113-1 logic instructions forms the subscriber handler process 113-2. In other words, the subscriber handler process 113-2 represents one or more portions of the logic instructions of the subscriber handler application 113-1 while being executed or otherwise performed on, by, or in the processor 112 within the computerized device 120.

Figure 8:
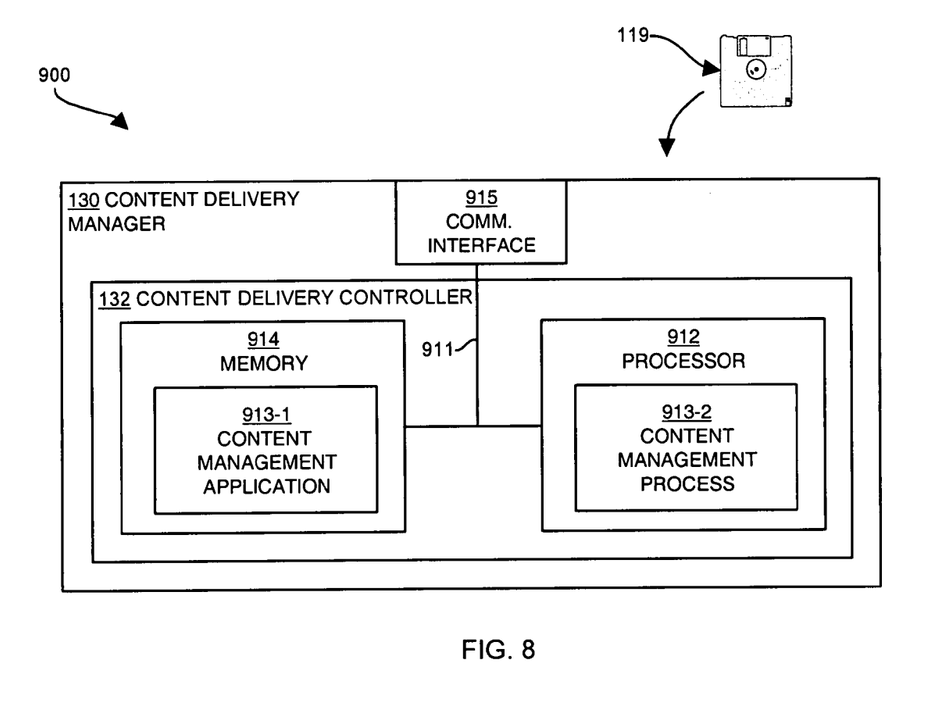
FIG. 8 depicts a computer implementation of a content delivery manager, according to one embodiment of the invention.

FIG. 8 depicts a computer implementation 900 of the content delivery manager 130, according to one embodiment of the invention. A computer program product 119 includes an application or logic instructions, such as subscriber handler instructions, that are loaded into the content delivery manager 130 to configure the content delivery manager 130 to manage content distribution.

The content delivery manager 130 in this embodiment of the invention includes an interconnection mechanism 911 such as a data bus and/or other circuitry that interconnects a controller 132, including a memory 914 and a processor 912, and one or more communications interfaces 915.

The memory 914 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 914 is encoded with logic instructions (e.g., software code) and/or data that form a content management application 913-1 configured according to embodiments of the invention. In other words, the content management application 913-1 represents software code, instructions and/or data that represent or convey the processing logic steps and operations as explained herein and that reside within memory or storage or within any computer readable medium accessible to the content delivery manager 130.

The processor 912 represents any type of circuitry or processing device such as a central processing unit, microprocessor or application-specific integrated circuit that can access the content management application 913-1 encoded within the memory 914 over the interconnection mechanism 911 in order to execute, run, interpret, operate or otherwise perform the content management application 913-1 logic instructions. Such performance of the content management application 913-1 logic instructions forms the content management process 913-2. In other words, the content management process 913-2 represents one or more portions of the logic instructions of the content management application 913-1 while being executed or otherwise performed on, by, or in the processor 912 within the content delivery manager 130.

Those skilled in the art will understand that there can be many variations made to the embodiments explained above while still achieving the same objective of those embodiments and the invention in general.

For example, as described above, the presence system 102 includes a content host 110 and a presence server 120. The presence system 102, in one arrangement, however, is a logical presence system, implemented by multiple cooperating presence servers 120.

For example, as described above, the content delivery manager 130 controls placement of content 171 among content servers 140 of the content delivery network 170 to provide relatively fast and efficient delivery of content 171 to the content subscriber 150. Also as described, such placement of content 171 is based upon the geographic relationship between the content subscribers 150 and the content servers 140. The content delivery manager 130, in another arrangement, distributes the content among the content servers 140 based upon the number of requests received from content subscribers 150 in order to load balance the requests throughout the content delivery network 170. In another arrangement, the content delivery manager 130 distributes the content 171 among the content servers 140 based upon changes in the quantity or locations of the content subscribers 150 or changes in the content 171 provides by the content host 110.

In another example, as described above, the system 100 has a content host 110 that provides notification of the availability of content 171 to the presence server 120 and provides the content to the content delivery network 170. The system also has a content subscriber 150 that receives notification from the presence server 120 regarding the availability of content 171 associated with the content host 110 and retrieves the content 171 from the content delivery network 170. In the system 100, in another embodiment, however, the content host 110 can also subscribe to presence information 167 relating to content subscribers 150 within the system 100 (e.g., the content host 110 is a content subscriber 150). Also in the system 100, the content subscriber 150 can provide presence information to the presence server 120 and content 171 to the content delivery network (e.g., the content subscriber 150 is a content host 110).

In another example, as described above, the presence server 120 receives network information 168 from the content delivery network 170 prior to providing the network information 168 to the content subscriber 150 as part of the notification message 173. In another embodiment, the presence server 120 receives the network information 168 from the content host 110. In this embodiment, when the content host 110 transmits content 171 to the content delivery network 170, the content delivery manager 130 transmits, to the content host 110, network information 168, such as a URL, to the content host 110. In turn, the content host 110 provides the network information 168 to the presence server 120 for distribution to content subscribers 150.

In another example, as described above, the presence server 120 transmits an notification message 173 to a content subscriber 150 in response to receiving a subscription request 172. The notification message 173 has presence information 167 indicating availability of content 171 associated with the content host 110 and network information 168 indicating the content delivery network 170 having the content 171 received from the content host 110. In another embodiment, the presence server 120 transmits the notification message 173 to the content subscriber 150 in separate stages. For example, when transmitting the notification message 173, the presence server 120 first transmits presence information 167 to the content subscriber 150 and subsequently transmits the network information 168 to the content subscriber 150.

In another example, as described above, the content host 110 provides content 171 to the content delivery network 170. Multiple content hosts 110, however, can provide content 171 to the content delivery network 170 simultaneously. For example, multiple content hosts 110 can each use the same URL to point to a content server 140 within the content delivery network 170 (e.g., in a "transparent" mode, the content hosts 110 treat the content delivery network 170 as a single logical server). In one arrangement, the content delivery network 170 detects multiple, independent content hosts 110 that offer identical content 171 (e.g., the same audio file). The content delivery manager 130 accounts for the multiple content hosts 110 that provide the identical content 171 in their respective locales by adjusting the locations (e.g., content server locations) of the content 171 maintained within the content delivery network 170.

In another example, as described above, the root hierarchical element 410 includes one or more hierarchically arranged sublevels that relate to distinct subscription constraints for particular content subscribers 150. For example, a first sublevel 420 beneath the provider status level 410 includes the audio media status level and a second sublevel 440 beneath the provider status level 410 includes a video media status level. Each sublevel 420, 440, in another arrangement, is further divided into subcategories. For example, an audio sublevel 420 can be further divided into "classical", "rock", and "country" audio subcategories. Therefore, a content subscriber 150 who subscribes to the first sublevel 420 can receive notification regarding the availability of content 171 within all subcategories ("classical", "rock", and "country" audio). Furthermore, a subscriber 150 to a particular subcategory receives notification regarding availability of content 171 only with the particular subcategory (e.g. a classical content subscriber only receives notification regarding classical content availability).

Such variations are intended to be covered by the scope of this invention. As such, the foregoing description of embodiments of the invention is not intended to be limiting. Rather, any limitations to the invention are presented in the following claims.

What is claimed is:

1. In a computerized device, a method for providing content from a content host using a content delivery network, the content delivery network having content servers and having a content delivery manager that directs placement of the content among the content servers, the method comprising the steps of:

receiving information from the content host, the presence information indicating the availability of content associated with the content host, the content host different from any of the content servers and different from the content delivery manager of the content delivery network;

receiving a subscription request from a content subscriber; and transmitting a notification message to the content subscriber, the notification message having the presence information from the content host, indicating availability of content associated with the content host, and having network information indicating the content delivery network having the content received from the content host, the notification message enabling the content subscriber to acquire the content from the content delivery network, wherein the step of receiving a subscription request comprises the step of receiving content subscriber identifier information from the content subscriber and further comprising, in response to receiving content subscriber identification information, the steps of:

receiving an access restriction from the content host, the access restriction indicating a limitation on content access for a content subscriber, wherein the step of receiving an access restriction comprises the step of receiving a hierarchical arrangement of presence information from the content host, the hierarchical arrangement indicating a subscription constraint for the presence information; and detecting content subscriber access to the presence information based upon a comparison between the content subscriber identifier information and the access restriction.

2. The method of claim 1 further comprising, in response to receiving content subscriber identifier information, the step of:
transmitting the content subscriber identifier information to the content delivery manager to allow the content delivery manager to identify at least one content server for providing the content to the content subscriber.

3. The method of claim 2 further comprising the step of receiving network information from the content delivery manager, the network information indicating the at least one content server for providing content to the subscriber based upon the content subscriber identifier information.

4. The method of claim 3, wherein
receiving content subscriber identifier information from the content subscriber comprises receiving content subscriber identifier information from the content subscriber, the content subscriber identifier information indicating a geographic location of the content subscriber;
transmitting comprises transmitting the content subscriber identifier information to the content delivery manager to allow the content delivery manager to identify at least one content server for providing the content to the content subscriber, based upon the geographic location of the content subscriber; and
receiving comprises receiving network information from the content delivery manager, the network information indicating the at least one content server for providing content to the subscriber based upon the geographic location of the content subscriber.

5. The method of claim 1 further comprising the step of receiving network information from the content delivery network, the network information indicating the location of the content within the content delivery network.

6. The method of claim 1, wherein receiving the subscription request from the content subscriber comprises receiving the subscription request from the content subscriber, the subscription request relating to a request for the status of the content associated with the content host.

7. The method of claim 6, wherein receiving the subscription request from the content subscriber comprises receiving the subscription request from the content subscriber, the subscription request relating to a request for the current value of the presence information for the content host.

8. The method of claim 6, wherein receiving the subscription request from the content subscriber comprises receiving the subscription request from the content subscriber, the subscription request relating to a request for notification for a change in presence information for the content host.

9. The method of claim 1, wherein transmitting the notification message to the content subscriber comprises transmitting the notification message to the content subscriber, the notification message having the presence information from the content host, indicating availability of content associated with the content host, and having network information indicating the content delivery network having the content received from the content host, the notification message enabling the content subscriber to acquire the content from the content delivery network, the notification message having a network address of the content manager or a content server of the content delivery network.

10. The method of claim 1 wherein:
receiving the hierarchical arrangement of presence information comprises receiving the hierarchical arrangement of presence information from the content host, the hierarchical arrangement having a root level provider status level and at least one sublevel; and detecting comprises:
detecting content subscriber access to all of the presence information associated with the content host based upon a match between the content subscriber identifier information and the root level provider status level of the hierarchical arrangement of presence information; and
detecting content subscriber access to presence information of the content host associated with the at least one sublevel based upon an absence of a match between the content subscriber identifier information and the root level provider status level of the hierarchical arrangement of presence information and a match between the content subscriber identifier information and the at least one sublevel of the hierarchical arrangement of presence information.

11. A computerized device comprising:
at least one communications interface;
a controller; and
an interconnection mechanism configured to communicate with a content delivery network, the content delivery network having content servers and a content delivery manager wherein the content delivery manager directs placement of content among the content servers, the interconnection mechanism coupling the at least one communications interface and the controller; and
wherein the controller is configured to:
receive, through the interface, presence information from the content host, the presence information indicating the availability of content associated with the content host, the content host different from any of the content servers and different from the content delivery manager of the content delivery network;
receive, through the interface, a subscription request from a content subscriber; and
transmit, through the interface, a notification message to the content subscriber, the notification message having the presence information from the content host, indicating availability of content associated with the content host, and having network information indicating the content delivery network having the content received from the content host, the notification message enabling the content subscriber to acquire the content from the content delivery network,
wherein, when receiving a subscription request, the controller is configured to receive, through the interface, content subscriber identifier information from the content subscriber and wherein, in response to receiving content subscriber identification information, the controller is configured to:
receive an access restriction from the content host, the access restriction indicating a limitation on content access for a content subscriber, wherein, when receiving an access restriction, the controller is configured to receive a hierarchical arrangement of presence information from the content host, the hierarchical arrangement indicating a subscription constraint for the presence information; and
detect content subscriber access to the presence information based upon a comparison between the content subscriber identifier information and the access restriction.

12. The computerized device of claim 11 wherein, in response to receiving content subscriber identifier information, the controller is configured to:

transmit the content subscriber identifier information to the content delivery manager, through the interface, to allow the content delivery manager to identify at least one content server for providing the content to the content subscriber.

13. The computerized device of claim 12 wherein the controller is further configured to receive network information, through the interface, from the content delivery manager, the network information indicating the at least one content server for providing content to the subscriber based upon the content subscriber identifier information.

14. The computerized device of claim 11 wherein the controller is further configured to receive, through the interface, network information from the content delivery network, the network information indicating the location of the content within the content delivery network.

15. A computer program product having a computer-readable medium including computer program logic encoded thereon that, when performed on a controller in a computerized device having a coupling to at least one communications interface provides a method for performing the operations of:

receiving presence information from a content host, the presence information indicating the availability of content associated with the content host, the content host different from any content server and different from a content delivery manager of a content delivery network;

receiving a subscription request from a content subscriber; and transmitting a notification message to the content subscriber, the notification message having the presence information from the content host, indicating availability of content associated with the content host, and having network information indicating the content delivery network having the content received from the content host, the notification message enabling the content subscriber to acquire the content from the content delivery network, wherein the step of receiving a subscription request comprises the step of receiving content subscriber identifier information from the content subscriber and further comprising, in response to receiving content subscriber identification information, the steps of:

receiving an access restriction from the content host, the access restriction indicating a limitation on content access for a content subscriber, wherein the step of receiving an access restriction comprises the step of receiving a hierarchical arrangement of presence information from the content host, the hierarchical arrangement indicating a subscription constraint for the presence information; and detecting content subscriber access to the presence information based upon a comparison between the content subscriber identifier information and the access restriction.

16. A computerized device comprising:

at least one communications interface;

a controller; and an interconnection mechanism configured to communicate with a content delivery network, the content delivery network having content servers and a content delivery manager wherein the content delivery manager directs placement of content among the content servers, the interconnection mechanism coupling the at least one communications interface and the controller; and wherein the controller is configured produce a means for providing content from a content host using a content delivery network, such means comprising:

means for receiving, through the interface, presence information from the content host, the presence information indicating the availability of content associated with the content host, the content host different from any of the content servers and different from the content delivery manager of the content delivery network;

means for receiving, through the interface, a subscription request from a content subscriber; and means for transmitting, through the interface, a notification message to the content subscriber, the notification message having the presence information from the content host, indicating availability of content associated with the content host, and having network information indicating the content delivery network having the content received from the content host, the advertising message enabling the content subscriber to acquire the content from the content delivery network, wherein, when receiving a subscription request, the controller is configured to produce a means for receiving, through the interface, content subscriber identifier information from the content subscriber and wherein, in response to receiving content subscriber identification information, the controller is configured to produce a means for providing content from a content host using a content delivery network, such means comprising:

means for receiving an access restriction from the content host, the access restriction indicating a limitation on content access for a content subscriber, wherein, when receiving an access restriction, the controller is configured to produce a means for receiving a hierarchical arrangement of presence information from the content host, the hierarchical arrangement indicating a subscription constraint for the presence information; and means for detecting content subscriber access to the presence information based upon a comparison between the content subscriber identifier information and the access restriction.

* * * * *